United States Patent
Maes et al.

(10) Patent No.: US 6,689,289 B1
(45) Date of Patent: Feb. 10, 2004

(54) SYNERGISTIC COMBINATIONS OF CARBOXYLATES FOR USE AS FREEZING POINT DEPRESSANTS AND CORROSION INHIBITORS IN HEAT TRANSFER FLUIDS

(75) Inventors: Jean-Pierre Maes, Merelbeke (BE); Peter Roose, Sint-Martens-Latem (BE)

(73) Assignees: Texaco Inc., San Ramon, CA (US); Texaco Development Corporation, San Ramon, CA (US)

( * ) Notice: Subject to any disclaimer, the term of this patent is extended or adjusted under 35 U.S.C. 154(b) by 0 days.

(21) Appl. No.: 10/031,663

(22) PCT Filed: Jun. 20, 2000

(86) PCT No.: PCT/EP00/05661

§ 371 (c)(1), (2), (4) Date: Jul. 3, 2002

(87) PCT Pub. No.: WO01/05906

PCT Pub. Date: Jan. 25, 2001

(30) Foreign Application Priority Data

Jul. 16, 1999 (EP) ............................................. 99305665

(51) Int. Cl.$^7$ ............................. C09K 5/20; C23F 11/12
(52) U.S. Cl. ............................. 252/76; 252/70; 252/79; 123/41.01; 123/41.42
(58) Field of Search ............................. 252/70, 76, 79; 123/41.01, 41.42

(56) References Cited

U.S. PATENT DOCUMENTS

| | | | | |
|---|---|---|---|---|
| 3,779,927 A | * | 12/1973 | Howell et al. ................. | 252/75 |
| 4,179,522 A | * | 12/1979 | Huitson ...................... | 514/557 |
| 5,104,562 A | * | 4/1992 | Kardos et al. ................ | 252/79 |
| 6,413,445 B1 | * | 7/2002 | Oppenlander et al. ...... | 252/78.1 |
| 6,508,951 B1 | * | 1/2003 | Mori et al. .................... | 252/73 |

FOREIGN PATENT DOCUMENTS

| | | | | |
|---|---|---|---|---|
| CA | 2220315 A | * | 6/1998 | |
| GB | 2046748 A | * | 11/1980 | |
| WO | WO96/26990 A1 | * | 9/1996 | |
| WO | WO98/59013 A1 | * | 12/1998 | |

* cited by examiner

*Primary Examiner*—Anthony J. Green
(74) *Attorney, Agent, or Firm*—Steven R. Ellinwood

(57) ABSTRACT

An aqueous fluid composition having a $C_1$–$C_2$ carboxylic acid salt and a $C_3$–$C_5$ carboxylic acid salt is used as a heat transfer fluid that provides improved heat transfer properties and improved corrosion protection. Such properties are desired for fluids used as an antifreeze coolant in automotive engines. The addition of a $C_6$–$C_2$ carboxylic acid further improves corrosion protection. The addition of hydrocarbyl triazoles or thiazoles also further improves corrosion protection. One specific embodiment of the present invention includes a solution of potassium formate, sodium propanoate, and sodium heptanoate in a weight ratio of 20:20:5, respectively, where the pH of the solution is between 8 and 9.5.

46 Claims, No Drawings

SYNERGISTIC COMBINATIONS OF CARBOXYLATES FOR USE AS FREEZING POINT DEPRESSANTS AND CORROSION INHIBITORS IN HEAT TRANSFER FLUIDS

This application is a section 371 national stage filing of PCT/EP00/005661, filed Jun. 20, 2000.

FIELD OF THE INVENTION

The present invention relates to aqueous heat transfer fluids particularly antifreeze coolants and general cooling fluids that provide both frost protection and corrosion protection by use of synergistic combinations of carboxylic acids. The heat transfer fluids of this invention are non-toxic, environmentally friendly and provide improved heat-transfer properties, compared to traditional glycol based coolants and heat-transfer fluids. Improved corrosion protection is obtained compared to formate and acetate based heat transfer fluids using conventional corrosion inhibitors. The heat transfer fluids of the present invention can be used in any heat-exchange application including industrial heat-exchangers, refrigeration- and cooling systems, cooling towers, open and closed heat exchangers and for cooling internal combustion engines. The fluids protect the equipment from frost and corrosion damage.

BACKGROUND OF THE INVENTION

Effective Heat Exchange

Heat transfer fluids, whether used for heat-transfer in industrial or automotive applications have been, almost without exception, water-based. The efficiency of a heat transfer fluid to transport heat away from heat producing surfaces can be expressed in terms of the specific heat and thermal conductivity of the fluid. Specific heat of a substance is the ratio of its thermal capacity to that of water. The thermal capacity is the quantity of heat necessary to produce unit change of temperature in unit mass. Thermal conductivity of a substance is the time rate of transfer of heat by conduction through a mass of unit thickness, across a unit area for a unit difference of temperature. Viscosity of the heat transfer fluid is also a factor in evaluating the overall heat exchange efficiency—a better fluidity will contribute to an effective heat transport. Compared to most other heat-transfer fluids, water has the highest specific heat, the highest thermal conductivity and lowest viscosity. Whilst water is a most effective heat transfer fluid, it does not provide the required freezing and corrosion protection.

Freezing Point Depressant

Heat transfer fluids and engine coolants are known that contain high concentrations of inorganic salts to depress the freezing point. Calcium chloride is an example of the salts used to that purpose. Like other inorganic salts used for frost protection, it is extremely corrosive and corrosion cannot be adequately prevented by inhibitors. Another disadvantage of such coolants is that at very low temperatures, the solubility of inorganic salts is reduced. These drawbacks limit the use of inorganic salts as freezing point depressants in water.

Petroleum products, such as kerosene, have also been used in heat-exchange and cooling systems as a total replacement for water, but their adverse effect on rubber hoses, poor heat-transfer, and flammability has made their use impractical. Organic hydroxy compounds were found more reliable and ethylene glycol came into widespread use. Other heat transfer fluid bases included glycerol, the lower boiling point alcohols such as methanol, and propylene glycol Of these only propylene glycol is still under active consideration because of its low toxicity compared to ethylene glycol. In general, water/glycol mixtures are used today because they are chemically stable and compatible with the elastomers and plastics used in heat-exchange systems. In addition, they provide cost efficient freezing and boiling protection and can be formulated with inhibitors to provide the required corrosion protection. However, ethylene glycol is preferred as a heat transfer fluid base because of its high boiling point and flash point compared to methyl alcohol, its lower viscosity (better fluidity) and low cost compared to propylene glycol. Propylene glycol is used in applications where a lower toxicity is desirable. The heat-exchange capacity of water/freezing point depressant solutions is reduced with increasing freezing point depressant content.

Pure water remains a better heat transfer fluid compared to any mixture of ethylene- or propylene glycol. A compromise between the required freezing protection and heat exchange efficiency has to be made. Aqueous glycol solutions have higher viscosities at higher glycol concentrations. A better fluidity is thus obtained in solutions containing less freezing point depressant. Alkali salts of low molecular organic acids such as alkali metal acetate and alkali metal formate can also provide frost protection when dissolved in water. Compared to glycol, acetate and formate solutions have improved heat-transfer properties and lower viscosities, for a same level of frost protection. They are also more environmentally friendly than glycols. Formate and acetate based fluids have found applications as heat-exchange fluid and airport runway deicing fluids. U.S. Pat. No. 5,104,562 describes a coolant composition containing a potassium formate and potassium acetate.

Corrosion Protection

Corrosion in heat-exchange- and engine cooling systems will have two main effects: deterioration of the metal component either by uniform wastage or localised attack (pitting, crevice corrosion), and the production of insoluble corrosion products that will tend to block heat-exchangers, thermostat valves, filters and other components and to impede heat transfer by deposition on heat exchange surfaces. Regardless of the composition of the freezing point depressant, corrosion inhibitors are needed to reduce and control corrosion of the metals in contact with the fluid.

DISCLOSURE OF THE INVENTION

One aspect of the invention is that specific aqueous solutions of organic carboxylates show very low freezing points at eutectic compositions i.e. compositions mixed in such proportions that the freezing-point is a minimum, the constituents freezing simultaneously. This is very important, as the total organic salt content can be significantly reduced compared with conventional monocarbon carboxylates (formate or acetate) systems offering the same frost protection. The advantage is not only in improved economics but also, in better heat-transfer due to a higher specific heat and improved fluidity resulting from the higher water content at the same frost protection. In particular, it has been found that solutions of low carbon ($C_1$–$C_2$) carboxylic acid salts, in combination with higher carbon ($C_3$–$C_5$) carboxylic acid salts, provide synergistic frost protection. Very effective eutectica have been found for the combination of the alkali salts of a $C_1$ carboxylic acid (methanoic- or formic acid) and a $C_3$ carboxylic acid (propanoic- or propionic acid).

Another aspect of the present invention is that improved synergistic frost protection and corrosion protection is found by adding one or a plurality of $C_6$–$C_{12}$ carboxylic acids. It has been found that higher carbon carboxylates ($C_{12}$–$C_{16}$) also increase the corrosion protection, but their solubility in the salt solutions is very limited. Optionally the addition of hydrocarbyl triazoles or thiazoles can further improve the corrosion protection.

DETAILED DESCRIPTION AND EXAMPLES

Synergistic Frost Protection in Solutions of Lower Carbon ($C_1$–$C_2$) and Higher Carbon (C3–C5) Carboxylic Acid Salts The freezing point of carboxylate mixtures according to this invention are much lower than expected in comparison to freezing point reduction as determined separately for each component. Preferred ratios are from 3:1 to 1:3, preferably 1:1. This may be demonstrated by experimental data on aqueous mixtures of potassium formate ($C_1$) and sodium propanoate ($C_3$) Table 1 shows the results of freezing point determinations for different solutions of the $C_1$ and $C_3$ carboxylates.

TABLE 1

| Weight Ratio Potassium Formate ($C_1$): Sodium Propanoate ($C_3$) Water 100 | Freezing Temperature ° C. |
|---|---|
| 40:0 | −36 |
| 35:5 | −38 |
| 30:10 | −42 |
| 20:20 | −48 |
| 25:15 | −45 |
| 0:40 | −32 |

The pure solution of potassium formate (40:0) in water has a freezing point of −36° C. The same concentration of sodium propanoate (40:0) in water has a freezing point of −32° C. In mixtures of the two components a freezing point below −48° C. is found at a ratio 20:20, which is remarkably lower than the expected mid-point of −34° C. calculated using the addition rule. The laws of molecular freezing point depression are apparently no longer valid for this type of solution. The combination of the added organic salts seem to interfere with the solidification of water to ice crystals in a way that it inhibits the possibility to obtain a regular crystal structure in the water molecules. Without being bound by theory, it is also believed that the selected cations play an important role in the synergistic freezing point depression. Substitution of the sodium by potassium in the propanoate does not yield as great a frost protection effect. Thus a most preferred system is the combination of a $C_1$ potassium carboxylate salt and a $C_3$ sodium carboxylate salt.

Similar synergistic effects are found when combining other solutions of differing carbon number e.g. aqueous mixtures of acetate salts ($C_2$) and butyrate salts ($C_4$).

Further Improved Synergistic Frost Protection and Corrosion Protection Upon Addition One or More $C_6$–$C_{12}$ Carboxylic Acids to Aqueous Solutions of Low Carbon ($C_1$–$C_2$) and Higher Carbon ($C_3$–$C_5$) Carboxylic Acid Salts The use of $C_6$–$C_{12}$ carboxylates as corrosion inhibitors has been investigated in aqueous solutions of low carbon ($C_1$–$C_2$) and higher carbon ($C_3$–$C_5$) carboxylic acid salts used as freezing point depressants. Different combinations of conventional inhibitors such as borax, benzoates, molybdates and nitrites are currently used with hydrocarbyl triazole for corrosion protection in acetate and formate salt solutions. Some of these inhibitors are toxic and harmful to the environment. Others are not very stable in organic salts solutions and may precipitate out of solution under conditions of high temperatures or severe frost. By using $C_6$–$C_{12}$ carboxylate 1inhibitors in $C_1$–$C_5$ carboxylate freezing point depressant solutions at from 1 to 10%, it has been found that these problems may be resolved. Overall stability of the product is improved. A further synergistic improvement of the frost protection properties was found. On their own, $C_6$–$C_{12}$ carboxylates are poor freezing point depressants. The addition of small amounts of $C_6$–$C_{12}$ acids to the combination of acids further improves the frost properties, significantly far beyond what could be expected. Table 2 shows the freezing point depression gained by the addition of 5% sodium heptanoate ($C_7$).

TABLE 2

| Weight Ratio Potassium Formate ($C_1$): Sodium Propanoate ($C_3$): Sodium Heptanoate ($C_7$) Water 100 | Freezing Temperature ° C. |
|---|---|
| 40:0:5 | −42 |
| 35:5:5 | −46 |
| 30:10:5 | −49 |
| 20:20:5 | n.d.* |
| 25:15:5 | −50 |
| 0:40:5 | n.d.* |

*: not determined (freezing point is below −50°0 C.)

A comparison between the corrosion protection of different low carbon containing organic acid salts solutions with traditional inhibitor packages and the newly developed synergistic combinations of carboxylate based solutions shows that there is a significant improvement in corrosion protection.

The present invention will be described with reference to the following non-limiting examples. Tables 3 and 4 show the results of corrosion tests.

EXAMPLES

Comparative Example A (Traditional Formate-Based Formulation)

One liter of an aqueous antifreeze formulation was prepared comprising of 320 g potassium hydroxide, 275 ml formic acid (98%), 15 g sodium benzoate and 2 g tolyltriazole pH=8.8.

Invention Example 1

One liter of an aqueous formulation was prepared comprising of 320 g potassium hydroxide, 275 ml formic acid (98%), 13 g 2-ethylhexanoic acid, 1 g sebacic acid, 0.8 g tolyltriazole and 4 g sodium hydroxide, adjusted to pH 9.

Invention Example 2

One liter of an aqueous antifreeze formulation was prepared comprising of 115 g potassium hydroxide, 110 ml formic acid (98%), 200 g sodium propanoate, 16.2 g 2-ethylhexanoic acid, 1.26 g sebacic acid, 1.0 g tolyltriazole and 4 g sodium hydroxide, adjusted to pH 9.

Comparative Example B (Traditional Acetate-Based Formulation)

One liter of an aqueous antifreeze formulation was prepared comprising of 400 g potassium hydroxide, 60 ml formic acid (98%), 360 ml acetic acid (99.5%), 800 ml water, 5 g sodium benzoate and 1 g benzotriazole.

Invention Example 3

One liter of an aqueous antifreeze formulation was prepared comprising 400 g potassium formate, 16.2 g 2-ethylhexanoic acid, 1.26 g sebacic acid, 1.0 g tolyltriazole and 4 g sodium hydroxide, adjusted to pH 8.8.

Invention Example 4

One liter of an aqueous formulation was prepared comprising of 115 g potassium hydroxide, 110 ml formic acid (98%), 200 g sodium propanoate, 13 g 2-ethylhexanoic acid, 1 g sebacic acid, 0.8 g tolyltriazole and 4 g sodium hydroxide, adjusted to pH 8.2.

TABLE 3

Glassware Corrosion Tests - 336 Hours - similar to ASTM D1384

| | Weight loss (mg/coupon) | | | | | |
|---|---|---|---|---|---|---|
| | Copper | Solder | Brass | Steel | Iron | Aluminium |
| (Comparative) Ex. A | 9.9 | 115.4 | 1.2 | 4.0 | 174.5 | −0.1 |
| (Invention) Ex. 1 | 2.9 | 88.2 | 2.8 | 38.6 | 96.3 | −3.2 |
| (Invention) Ex. 2 | 3.0 | 79.8 | 2.5 | 12.4 | 19.8 | |

TABLE 4

Aluminium Hot Corrosion Test Similar to ASTM D4340

| | Formulation | Weight loss on aluminium coupon (mg/cm$^2$/week) |
|---|---|---|
| (Invention) | Ex. 1 | 0.51 |
| (Comparative) | Ex. B | 7.01 |
| (Invention) | Ex. 3 | 1.54 |
| (Invention) | Ex. 4 | 1.47 |

It is seen that the examples according to the present invention show a reduction in weight loss of many metals, e.g. copper, solder and iron. The weight loss on aluminium coupons (Table 4) is significant as aluminium is a major component of automotive engines.

What is claimed is:

1. A heat transfer fluid composition comprising a mixture of a $C_1$–$C_2$ carboxylic acid salt, a $C_3$–$C_5$ carboxylic acid salt and a $C_6$–$C_{12}$ carboxylate.

2. The composition as claimed in claim 1 further comprising a substance selected from a hydrocarbyl thiazole or a hydrocarbyl triazole.

3. The composition as claimed in claim 1 wherein the ratio of $C_1$–$C_2$ carboxylic acid salt to $C_3$–$C_5$ carboxylic acid is from 3:1 to 1:3.

4. The composition as claimed in claim 3 wherein the ratio of $C_1$–$C_2$ carboxylic acid salt to $C_3$–$C_5$ carboxylic acid salt is 1:1.

5. The composition as claimed in claim 1 wherein the $C_1$–$C_2$ carboxylic acid salt includes potassium.

6. The composition as claimed in claim 1 wherein the $C_3$–$C_5$ carboxylic acid salt includes sodium.

7. The composition as claimed in claim 1 wherein the $C_6$–$C_{12}$ carboxylate is present in solution at from 1 to 10 wt %.

8. The composition as claimed in claim 1 comprising a mixture of potassium formate, sodium propanoate and sodium heptanoate.

9. The composition as claimed in claim 1 in a ratio of 20:20:5 respectively.

10. The composition as claimed in claim 1 having a pH of from 8 to 9.5.

11. An aqueous heat transfer solution comprising:
  a $C_1$–$C_2$ carboxylic acid salt; and
  a $C_3$–$C_5$ carboxylic acid salt;
  wherein the $C_1$–$C_2$ carboxylic acid salt and the $C_3$–$C_5$ carboxylic acid salt are present in said solution as a freezing point depressant in synergistic amounts.

12. The heat transfer fluid of claim 11, further comprising a $C_6$–$C_{12}$ carboxylate.

13. The heat transfer fluid of claim 11, further comprising a hydrocarbyl thiazole.

14. The heat transfer fluid of claim 11, further comprising a hydrocarbyl triazole.

15. The heat transfer fluid of claim 11, wherein the ratio of the $C_1$–$C_2$ carboxylic acid salt to the $C_3$–$C_5$ carboxylic acid salt is about 1:1.

16. The heat transfer fluid of claim 11, wherein the $C_1$–$C_2$ carboxylic acid salt includes potassium.

17. The heat transfer fluid of claim 11, wherein the $C_3$–$C_5$ carboxylic acid salt includes sodium.

18. The heat transfer fluid of claim 12, wherein the $C_6$–$C_{12}$ carboxylate is present in solution at from about 1 wt % to about 10 wt %.

19. The heat transfer fluid of claim 12, wherein the $C_1$–$C_2$ carboxylic acid salt: $C_3$–$C_5$ carboxylic acid salt: $C_6$–$C_{12}$ carboxylate ratio is 20:20:5.

20. The heat transfer fluid of claim 11, wherein the pH of the composition is from about 8 to about 9.5.

21. The heat transfer fluid of claim 11, wherein the $C_1$–$C_2$ carboxylic acid salt is potassium formate.

22. The heat transfer fluid of claim 11, wherein the $C_3$–$C_5$ carboxylic acid salt is sodium propanoate.

23. The heat transfer fluid of claim 12, wherein the $C_6$–$C_{12}$ carboxylate is sodium heptanoate.

24. The heat transfer fluid of claim 11, wherein the ratio of the $C_1$–$C_2$ carboxylic acid salt to the $C_3$–$C_5$ carboxylic acid salt is about 3:1 to 1:3.

25. A heat transfer fluid comprising:
  potassium formate;
  sodium propanoate;
  and sodium heptanoate;
  wherein the heat transfer fluid is an aqueous solution.

26. The heat transfer fluid of claim 25, wherein the ratio of potassium formate to sodium propanoate is from about 3:1 to about 1:3.

27. The heat transfer fluid of claim 26, wherein the ratio of potassium formate to sodium propanoate is about 1:1.

28. The heat transfer fluid of claim 25, wherein sodium heptanoate is present in solution at from about 1 wt % to about 10 wt %.

29. The heat transfer fluid of claim 25, wherein the potassium formate: sodium propanoate:sodium heptanoate ratio is 20:20:5.

30. The heat transfer fluid of claim 25, wherein the pH of the composition is from about 8 to about 9.5.

31. A method for cooling internal combustion engine, comprising:
  providing a coolant comprising a $C_1$–$C_2$ carboxylic acid salt and a $C_3$–$C_5$ carboxylic acid salt; and
  placing a sufficient quantity of the coolant in a cooling system of the engine; and
  circulating the coolant in the engine cooling system.

32. The method of claim 31 wherein the coolant composition further comprises a substance selected from a hydrocarbyl thiazole or a hydrocarbyl triazole.

33. The method of claim 31 wherein the ratio of $C_1$–$C_2$ carboxylic acid salt to $C_3$–$C_5$ carboxylic acid salt is from 3:1 to 1:3.

34. The method of claim 33 wherein the ratio of $C_1$–$C_2$ carboxylic acid salt to $C_3$–$C_5$ carboxylic acid salt is 1:1.

35. The method of claim 31 wherein the $C_1$–$C_2$ carboxylic acid salt includes potassium.

36. The method of claim 31 wherein the $C_3$–$C_5$ carboxylic acid salt includes sodium.

37. The method of claim 31 wherein the pH of the coolant is from 8 to 9.5.

38. A method for improving frost protection and corrosion protection in an internal combustion engine, comprising:
   providing an aqueous heat transfer solution comprising:
      potassium formate and sodium propanoate present in said heat transfer solution as a freezing point depressant and corrosion protectant in synergistic effective amounts; and:
      placing the heat transfer solution in a cooling system of the engine; and circulating the heat transfer solution in the cooling system of the engine.

39. The method of claim 38, wherein the antifreeze coolant further comprises sodium heptanoate.

40. The method of claim 38, wherein the antifreeze coolant further comprises a hydrocarbyl thiazole.

41. The method of claim 38, wherein the antifreeze coolant further comprises a hydrocarbyl triazole.

42. The method of claim 38, wherein the ratio of potassium formate to sodium propanoate is about 1:1.

43. The method of claim 39, wherein the sodium heptanoate is present in solution at from about 1 wt % to about 10 wt %.

44. The method of claim 39, wherein the potassium formate:sodium propanoate: sodium heptanoate ratio is 20:20:5.

45. The method of claim 38, wherein the pH of the antifreeze coolant is from about 8 to about 9.5.

46. The heat transfer solution of claim 38, wherein the ratio of potassium formate to sodium propanoate is from 3:1 to about 1:3.

* * * * *